United States Patent
Mano et al.

(10) Patent No.: US 8,129,697 B2
(45) Date of Patent: Mar. 6, 2012

(54) LASER SCANNING MICROSCOPE

(75) Inventors: Shigeyuki Mano, Kamakura (JP);
Koichi Satoh, Yokohama (JP); Erik Martinus Marie Manders, Monnickendam (NL); Antonius Ronald Hoebe, Amersfoort (NL)

(73) Assignee: Nikon Corporation, Tokyo (JP)

( * ) Notice: Subject to any disclaimer, the term of this patent is extended or adjusted under 35 U.S.C. 154(b) by 28 days.

(21) Appl. No.: 12/858,557

(22) Filed: Aug. 18, 2010

(65) Prior Publication Data

US 2011/0036993 A1    Feb. 17, 2011

Related U.S. Application Data

(63) Continuation of application No. PCT/JP2009/052973, filed on Feb. 20, 2009.

(30) Foreign Application Priority Data

Feb. 22, 2008  (JP) .............................. P2008-041499
Feb. 22, 2008  (JP) .............................. P2008-041528
Apr. 21, 2008  (JP) .............................. P2008-110659
Apr. 21, 2008  (JP) .............................. P2008-110660

(51) Int. Cl.
*G01J 1/58* (2006.01)
(52) U.S. Cl. .................................................. 250/458.1
(58) Field of Classification Search .............. 250/458.1
See application file for complete search history.

(56) References Cited

U.S. PATENT DOCUMENTS

| 6,400,502 B1 | 6/2002 | Ooki |
| 6,621,628 B1 | 9/2003 | Ogino |
| 2001/0030802 A1 | 10/2001 | Ooki et al. |
| 2006/0120065 A1 | 6/2006 | Manders |

FOREIGN PATENT DOCUMENTS

| EP | 1627251 | 2/2006 |
| JP | 2007-500880 | 1/2007 |
| WO | WO 01/27680 | 4/2001 |
| WO | WO 2004/102249 | 11/2004 |

OTHER PUBLICATIONS

English language Abstract of JP 2001-108908, Publication No. 2001-108908, date of publication Apr. 20, 2001.
English language Abstract of JP 2000-66107, Publication No. 02066107, date of publication Mar. 6, 2000.

*Primary Examiner* — David Porta
*Assistant Examiner* — Carolyn Igyarto
(74) *Attorney, Agent, or Firm* — Staas & Halsey LLP

(57) ABSTRACT

The present invention relates to a laser scanning microscope capable of acquiring suitable fluorescent images. A fluorescence detection unit 26 measures a plurality of intensities of fluorescent light of different wavelengths that is excited by irradiation of laser light and emitted from a sample 12. Moreover, a CLEM processing unit 28 performs control, for each single pixel scanning time that is the amount of time during which a range corresponding to a single pixel of the image is scanned, to discontinue irradiation of the laser light in at least one of the case in which all of the plurality of intensities of fluorescent light are less than a lower limit threshold value at a lower limit value judgment time that is shorter than the time during which a range corresponding to a single pixel of the image is scanned, and the case in which any one of the plurality of intensities of fluorescent light exceeds an upper limit threshold value during the time during which a range corresponding to a single pixel of the image is scanned.

9 Claims, 9 Drawing Sheets

LASER SCANNING MICROSCOPE

This application is a continuation application, filed under 35 USC 111(a), of International Application PCT/JP2009/052973, filed Feb. 20, 2009, which is incorporated herein by reference in its entirety. This application claims foreign priority to Japanese Patent Application No. 2008-041499 filed on Feb. 22, 2008; Japanese Patent Application No. 2008-041528 filed on Feb. 22, 2008; Japanese Patent Application No. 2008-110659 filed on Apr. 21, 2008; and Japanese Patent Application No. JP 2008-110660 filed on Apr. 21, 2008, which are incorporated herein by reference in their entireties.

TECHNICAL FIELD

The present invention relates to a laser scanning microscope, and more particularly, to a laser scanning microscope capable of acquiring suitable fluorescent images.

BACKGROUND ART

Laser scanning microscopes have conventionally acquired fluorescent images using fluorescent light emitted from a sample such as live cells after having excited a fluorescent substance in the sample, or light transmission images using transmitted light that passes through a sample, by radiating laser light onto the sample and scanning the sample with the laser light.

In addition, Patent Document 1 discloses a laser scanning microscope that controls irradiation of laser light so as to discontinue irradiation in the case the intensity of fluorescent light received is equal to or greater than a prescribed upper limit threshold value and in the case the intensity of fluorescent light received is equal to or less than a prescribed lower limit threshold value in order to inhibit damage (discoloration) of a sample by laser light.

Patent Document 1: Japanese Translation of PCT Application No. 2007-500880

However, in the laser scanning microscope described above, when fluorescent images are respectively acquired by fluorescent light of a plurality of wavelengths that has been excited by laser light of a certain single wavelength, suitable fluorescent images are unable to be acquired unless irradiation of laser light is suitably controlled.

DISCLOSURE OF THE INVENTION

With the foregoing in view, the present invention makes it possible to acquire suitable fluorescent images.

The laser scanning microscope of the present invention is a laser scanning microscope that acquires an image by scanning samples with laser light, and is provided with fluorescence measuring means for measuring a plurality of intensities of fluorescent light of different wavelengths that is excited by irradiation of the laser light and emitted from the sample, and irradiation control means for performing control, for each single pixel scanning time that is the amount of time during which a range corresponding to a single pixel of the image is scanned, to discontinue irradiation of the laser light in at least one of the case in which all of the plurality of intensities of fluorescent light are less than a lower limit threshold value at a lower limit value judgment time that is shorter than the time during which a range corresponding to a single pixel of the image is scanned, and the case in which any one of the plurality of intensities of fluorescent light exceeds an upper limit threshold value during the time during which a range corresponding to a single pixel of the image is scanned.

In the laser scanning microscope of the present invention, a plurality of intensities of fluorescent light of different wavelengths, which is excited by irradiation of laser light and emitted from a sample, are measured, and control in which irradiation of the laser light is discontinued is carried out for each single pixel scanning time that is the amount of time during which a range corresponding to a single pixel of the image is scanned, in at least one of the case in which all of the plurality of measured intensities of fluorescent light are less than a lower limit threshold value at a lower limit value judgment time that is shorter than the time during which a range corresponding to a single pixel of the image is scanned, and the case in which any one of the plurality of intensities of fluorescent light exceeds an upper limit threshold value during the time during which a range corresponding to a single pixel of the image is scanned.

According to the laser scanning microscope of the present invention, suitable fluorescent images can be acquired.

DESCRIPTION OF THE REFERENCE NUMERALS

11 laser scanning microscope system, 12 sample, 13 laser scanning microscope, 14 personal computer, 15 display apparatus, 16 input apparatus, 17 application software, 21 laser light source unit, 22 laser scanning unit, 23 dichroic mirror, 24 objective lens, 25 stage, 26 fluorescence detection unit, 27 transmitted light detection unit, 28 CLEM processing unit, 29 image acquisition unit, 30 fiber, 31a to 31c laser light source, 32a to 32c shutter, 41 DM, 42 BA filter, 43 PMT, 51 file button, 52 switch button, 53, dynamic range button, 54 file button, 55 setting sheet, 61 and 62 input box, 63 scroll bar, 64 and 65 input box, 66 scroll bar, 71 and 72 input box, 73 scroll bar, 74 and 75 input box, 76 scroll bar, 81 and 82 switch button, 83 input box, 91 and 92 OR gate, 93 AND gate, 94 OR gate

BEST MODE FOR CARRYING OUT THE INVENTION

The following provides a detailed explanation of specific embodiments in which the present invention is applied with reference to the drawings.

Figure 1:
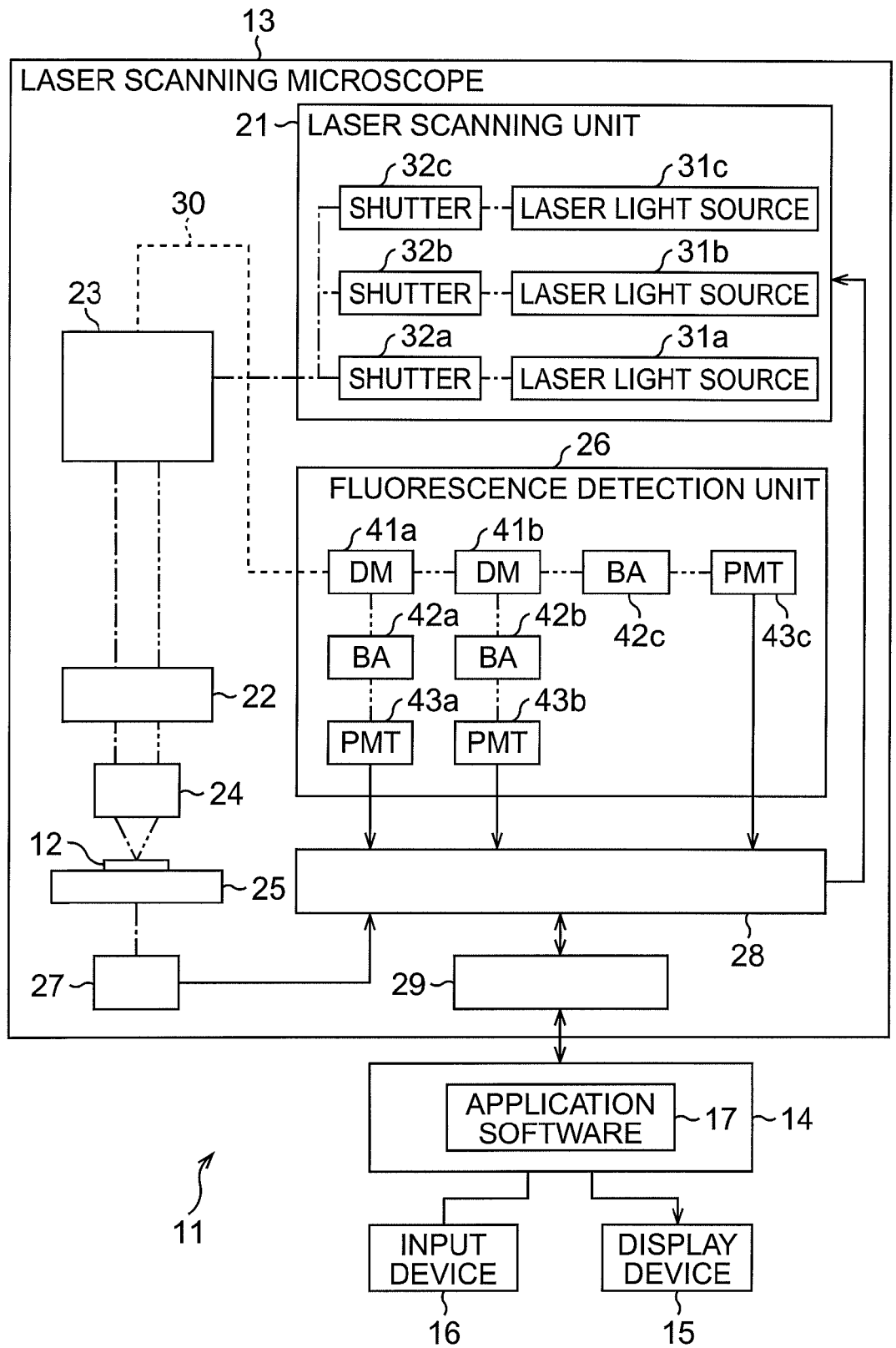
FIG. 1 is a block diagram showing an example of the configuration of an embodiment of a laser scanning microscope in which the present invention is applied.

FIG. 1 is a block diagram showing an example of the configuration of an embodiment of a laser scanning microscope in which the present invention is applied.

In FIG. 1, a laser scanning microscope system 11 is composed by connecting a laser scanning microscope 13, which acquires images by irradiating a sample 12 with laser light, and a personal computer 14 that controls the laser scanning microscope 13.

A display apparatus 15, composed of a cathode ray tube (CRT) or liquid crystal display (LCD) and the like, and an input apparatus 16, composed of a mouse and keyboard, are connected to the personal computer 14. The personal computer 14 displays images acquired by the laser scanning microscope 13 or GUI for allowing a user to input set values of the laser scanning microscope 13 on the display apparatus 15, or controls the laser scanning microscope 13 based on set values input as a result of the user operating the input apparatus 16, by running an application software 17 with a central processing unit (CPU).

In the laser scanning microscope 13, laser light from a laser light source unit 21 is irradiated onto the sample 12, a fluorescent substance in the sample 12 is excited by the laser light, and a fluorescent image generated by fluorescent light emitted from the sample 12 and a light transmission image generated by transmitted light that has passed through the sample 12 are acquired.

The laser light source unit 21 is provided with three laser light sources 31a to 31c, which each emit laser light of a different wavelength, and three shutters 32a to 32c for switching irradiation of laser light on and off. The shutters 32a to 32c are, for example, high-speed shutter devices such as acousto-optic modulators (AOM) or acousto-optic tunable filters (AOTF), and respectively switch irradiation of the sample 12 by laser light from the laser light sources 31a to 31c on and off in accordance with control by a CLEM processing unit 28 to be subsequently described.

Laser light (excitation light) emitted from the laser light source unit 21 is guided to a dichroic mirror 23 by optic fiber (not shown) of which the output end thereof is connected to a fiber connector (not shown), and the reflected laser light is guided into a laser scanning unit 22.

The laser scanning unit 22 is, for example, a galvano scanner composed by having a mirror that reflects laser light and a drive mechanism that drives the mirror, and laser light from the laser power source unit 21 scans the X-Y plane of the sample 12 (plane perpendicular to the optical axis of laser light radiated onto the sample 12). Laser light used to perform scanning by the laser scanning unit 22 is focused by an objective lens 24 and radiated onto the sample 12 on a stage 25.

Fluorescent light excited by being irradiated with laser light and emitted from the sample 12 enters the laser scanning unit 22 by passing through the objective lens 24 and then enters the dichroic mirror 23 after being descanned. After passing through the dichroic mirror 23, the fluorescent light enters a fluorescence detection unit 26 via a fiber 30.

In the fluorescence detection unit 26, fluorescent light from the sample 12 enters a dichroic mirror (DM) 41a, fluorescent light of a first long wavelength region is reflected by the DM 41a and enters a photomultiplier tube (PMT) 43a after scattered light from the sample 12 and optics has been filtered out by a barrier (BA) filter 42a.

In addition, fluorescent light that has passed through the DM 41a enters a DM 41b, and fluorescent light of a second wavelength region is reflected by the DM 41b and enters a PMT 43b after being filtered by a BA filter 42b. In addition, fluorescent light of a third wavelength region that has passed through the DM 41b enters a PMT 43c after being filtered by a BA filter 42c.

The PMT 43a to 43c detect the respectively received fluorescent light and supply an electrical signal (photoelectric conversion signal) of a voltage corresponding to each intensity of light to the CLEM processing unit 28. Furthermore, the PMT 43a to 43c will hereinafter be collectively referred to as PMT 43 unless it is necessary to distinguish each PMT.

In addition, laser light radiated onto the sample 12 that has passed through the sample 12 enters a transmitted light detection unit 27. The transmitted light detection unit 27 supplies an electrical signal of a voltage corresponding to the intensity of transmitted light that has passed through the sample 12 to the CLEM processing unit 28.

The CLEM processing unit 28 controls the shutters 32a to 32c of the laser light source unit 21 based on electrical signals from the PMT 43 within a prescribed amount of time corresponding to one pixel for each pixel of an image of the sample 12 (single pixel scanning time that is the time during which a range corresponding to a single pixel is scanned), and carries out processing that controls exposure time during which the sample 12 is exposed to irradiation of laser light (to be suitably referred to as controlled light-exposure microscopy (CLEM) processing).

In addition, the CLEM processing unit 28 carries out processing for outputting an electrical signal likely to be obtained when the sample 12 is exposed for an exposure time equivalent to a single pixel by arithmetically extrapolating an electrical signal from the PMT 43 or the transmitted light detection unit 27 when the exposure time is shorter than the exposure time equivalent to a single pixel that is set corresponding to the scanning speed of the laser light by carrying out CLEM processing (to be suitably referred to as CLEM extrapolation processing).

In the scanning laser microscope system 11, a user can set whether or not CLEM processing is carried out by the CLEM processing unit 28 by operating the personal computer 14, and in the case CLEM processing is set to be carried out, the CLEM processing unit 28 carries out CLEM processing along with CLEM extrapolation processing on an electrical signal from the fluorescence detection unit 26 and supplies the electrical signal to an image acquisition unit 29.

In addition, in the laser scanning microscope system 11, when CLEM processing has been set to be carried out, a user can set whether or not CLEM extrapolation processing is carried out on an electrical signal from the transmitted light detection unit 27 by operating the personal computer 14. In the case CLEM extrapolation processing is set to be carried out on an electrical signal from the transmitted light detection unit 27, the CLEM processing unit 28 supplies the electrical signal from the transmitted light detection unit 27 to the image acquisition unit 29, while in the case CLEM extrapolation processing is set to not be carried out on an electrical signal from the transmitted light detection unit 27, the electrical signal from the transmitted light detection unit 27 is supplied directly to the image acquisition unit 29.

The image acquisition unit 29 amplifies the electrical signal supplied from the CLEM processing unit 28, converts the electrical from analog to digital (A/D), carries out image processing in which an image is assembled from the electrical signal, and supplies image data obtained from this image processing to the personal computer 14. Namely, the image acquisition unit 29 acquires fluorescent light image data from the electrical signal from the fluorescence detection unit 26, and acquires transmitted light image data from the electrical signal from the transmitted light detection unit 27.

In the laser scanning microscope system 11, each image can be individually displayed on the display apparatus 15, each image can be overlapped with an image specified by a user, or each image can be divided and displayed on the display apparatus 15, based on the fluorescent light image data and transmitted light image data.

Figure 2:
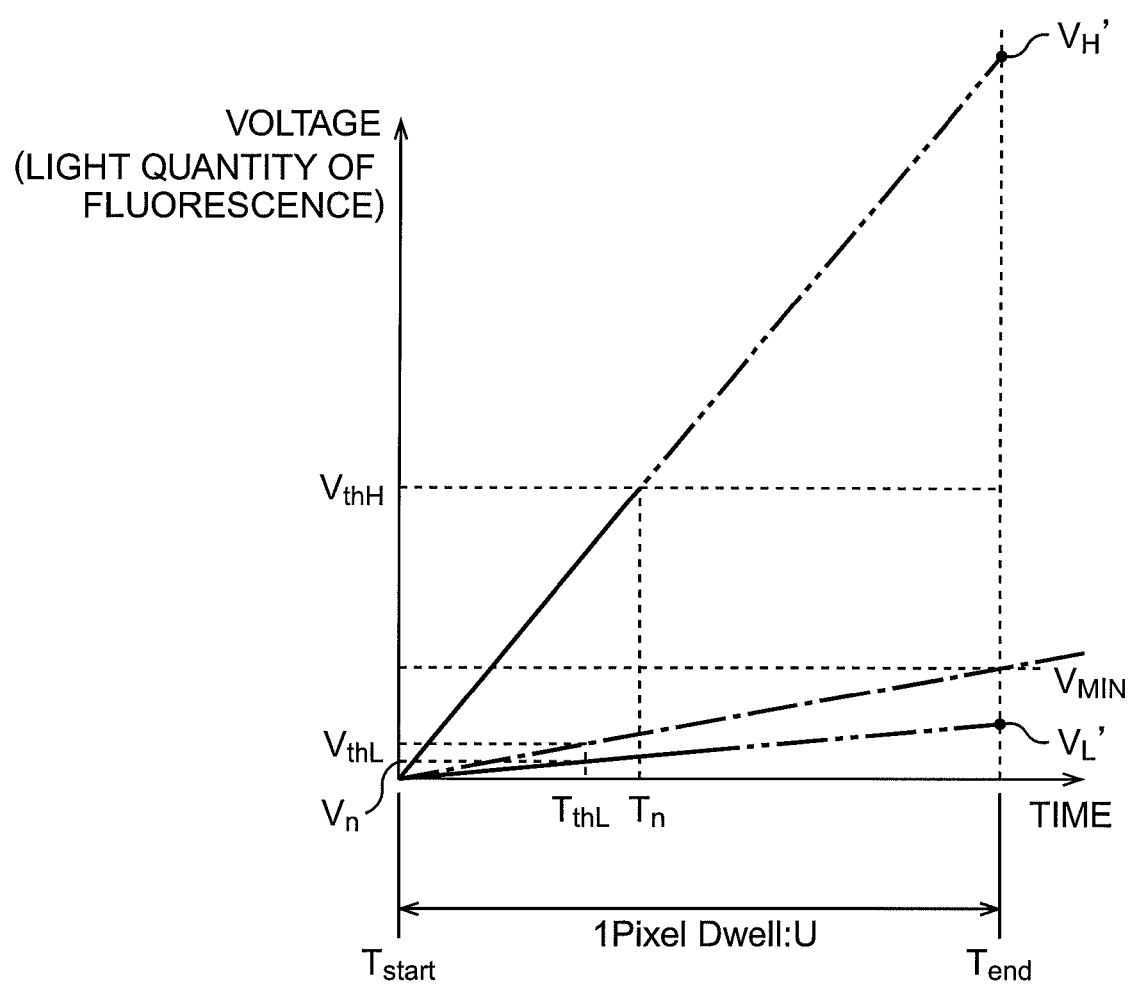
FIG. 2 is a drawing for explaining CLEM processing and CLEM extrapolation processing.

Next, an explanation is provided of CLEM processing and CLEM extrapolation processing with reference to FIG. 2.

In FIG. 2, time is plotted on the horizontal axis, and times are shown from a time $T_{start}$ when exposure of a certain single pixel starts to a time $T_{end}$ at which an exposure time U per pixel (single pixel dwell time) set corresponding to the scanning speed of the laser light has elapsed. In addition, integrated values of the voltage of electrical signals output from the PMT 43 corresponding to the intensity of fluorescent light received as measured by the PMT 43 (namely, integrated values of the intensity of fluorescent light) are plotted on the vertical axis.

In addition, in FIG. 2, $V_H{'}$ indicates a voltage value likely to be measured when single pixel exposure time U has elapsed that is calculated in the laser scanning microscope 13 based on $V_{thH}$ preliminarily set by a user as an adequate voltage value required to acquire images. In addition, $V_{MIN}$ indicates a lower limit voltage value that is set in the laser scanning microscope 13 as a signal that is lower the greater the degree to which it is considered to be background or not worth noting.

In the CLEM processing unit 28, the PMT 43 receives fluorescent light from the sample 12 and an electrical signal of a voltage corresponding to the intensity of light received is supplied from the PMT 43, after which the CLEM processing unit 28 begins integrating voltage from the time $T_{start}$, calculates an integrated value by integrating until the time $T_{end}$ according to a method to be described later, and outputs the integrated value as a pixel value of one pixel (intensity of fluorescent light).

Here, the CLEM processing unit 28 controls irradiation of laser light onto the sample 12 so as to discontinue irradiation of laser light by closing the shutters 32 in the case it has been judged that the voltage is unable to reach the minimum voltage $V_{MIN}$ when the single pixel exposure time U has elapsed, and in the case it has been judged that the voltage has reached the voltage $V_{thH}$ during the single pixel exposure time U. Namely, in the case the voltage has not reached the minimum voltage $V_{MIN}$ when the time U has elapsed, this means that the pixel is unable to adequately acquire signals from the PMT 43 and further acquisition of electrical signals is unnecessary. In addition, in the case the voltage has surpassed the voltage $V_{thH}$ during the single pixel exposure time U, this means that electrical signals have adequately been acquired from the PMT 43 and further acquisition of electrical signals is unnecessary. Thus, in this case, deterioration (discoloration) of the sample 12 is inhibited by discontinuing irradiation of laser light onto the sample 12.

For example, the CLEM processing unit 28 closes the shutters 32 in the case a judgment has been made as to whether or not a voltage $V_n$ at a lower limit value judgment time $T_{thL}$, which is a time at which a judgment is made as to whether or not a voltage reaches the minimum voltage $V_{MIN}$, is less than a lower limit threshold value $V_{thL}$ ($V_{thL} = V_{MIN} \times T_{thL}/U$) and the voltage $V_n$ at the lower limit value judgment time $T_{thL}$ has been determined to be less than the lower limit threshold value $V_{thL}$. In addition, when a voltage has exceeded a prescribed upper limit threshold value $V_{thH}$, for example, the CLEM processing unit 28 closes the shutters 32 by storing the time $T_n$ at which the voltage exceeded the upper limit threshold value $V_{thH}$.

In this manner, processing in which the CLEM processing unit 28 controls opening and closing of the shutters 32 of the laser light source 21 based on electrical signals corresponding to the intensity of light received from the PMT 43 for each pixel is CLEM processing.

In the case the shutters 32 are closed after having judged that a voltage does not reach the minimum voltage $V_{MIN}$, the CLEM processing unit 28 is able to determine a voltage likely to be obtained when exposure has been carried out to the time $T_{end}$ without closing the shutters 32 by linearly extrapolating the voltage $V_n$, at the lower limit value judgment time $T_{thL}$. Namely, a voltage $V_L{'}$ that is extrapolated when a voltage does not reach the minimum voltage $V_{MIN}$ is determined by $V_L{'} = V_n \times (U/T_{thL})$.

In addition, in the case the shutters 32 are closed after having judged that a voltage has reached the upper limit threshold value $V_{thH}$ during the single pixel exposure time U, the CLEM processing unit 28 is able to determine a voltage that is likely to be obtained when exposure has been carried out to the time $T_{end}$ without closing the shutters 32 by linearly extrapolating the time $T_n$ at the upper limit threshold value $V_{thH}$. Namely, a voltage $V_H{'}$ that is extrapolated when a voltage has exceeded the upper limit threshold value $V_{thH}$ is determined by $V_H{'} = V_{thH} \times (U/T_n)$.

In this manner, processing in which the CLEM processing unit 28 extrapolates a measured voltage when the shutters 32a to 32c have been closed by CLEM processing is CLEM extrapolation processing.

Figure 3:
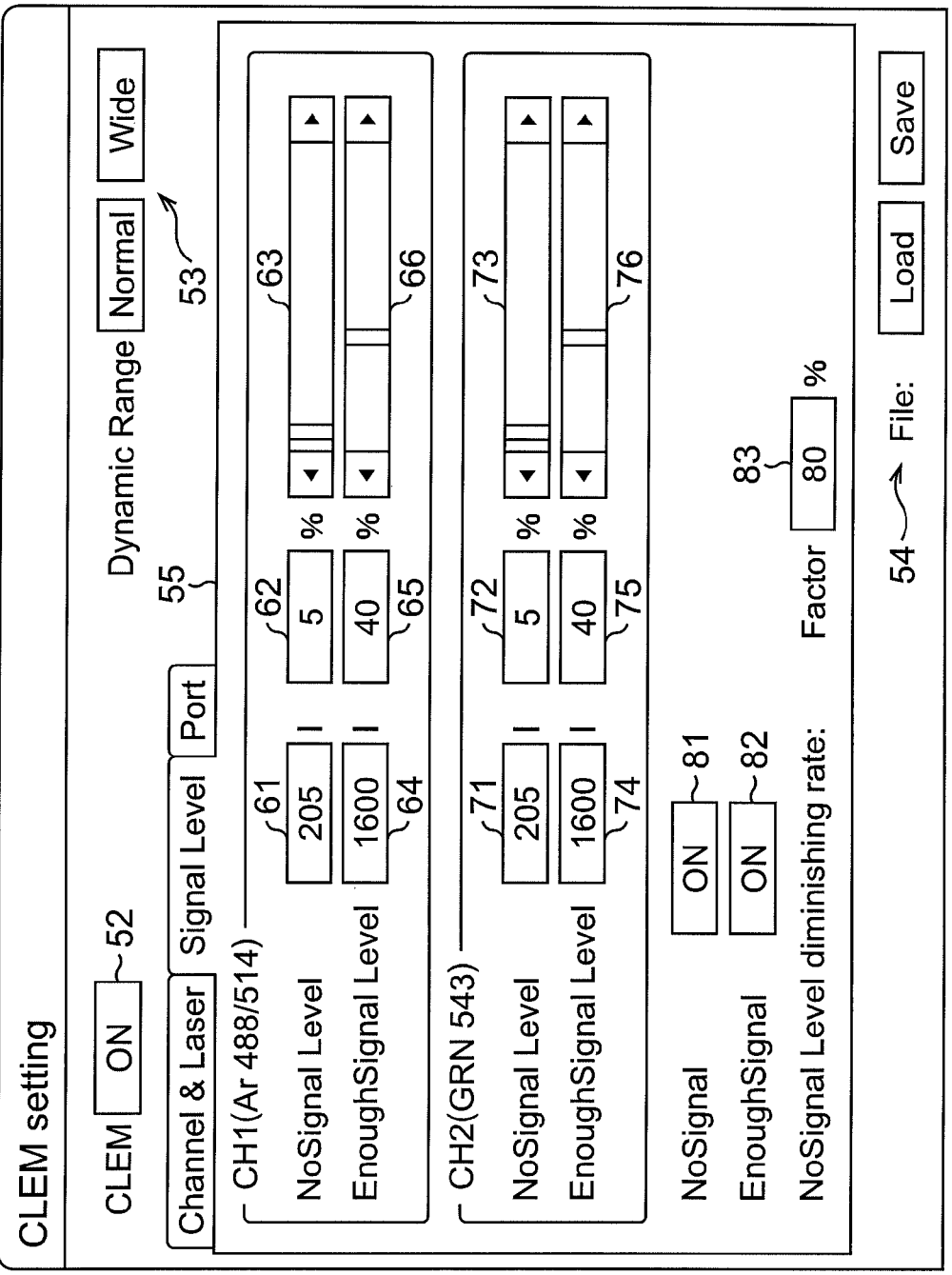
FIG. 3 is a drawing showing an example of a CLEM setting screen used to set CLEM processing.

Next, FIG. 3 is a drawing showing an example of a CLEM setting screen used to set CLEM processing.

For example, when a user operates the input apparatus 16 so as to set CLEM processing when starting observation of the sample 12 with the laser scanning microscope system 11 of FIG. 1, the personal computer 14 displays a CLEM setting screen 51 on the display apparatus 15.

The CLEM setting screen 51 displays a switch button 52 for switching CLEM processing on and off, a dynamic range button 53 for selecting normal or wide for the dynamic range of images obtained with the laser scanning microscope 13, a file button 54 for instructing a file describing CLEM processing settings to be loaded or saved, and a setting sheet 55 for making various settings.

The display of the setting sheet 55 can be changed by selecting a tab, and FIG. 3 shows a setting sheet for setting signal level (Signal Level). In addition, the setting sheet 55 also has a sheet for setting the type laser light source and channel (Channel & Laser) as well as a sheet for specifying ports for control communication (Port).

For example, in the laser scanning microscope 13, the laser light source 31a of the laser light source unit 21 is designated as channel 1 (CH1), and an input box 61, which is used to input a set value $V_L$ of a "target lower limit fluorescence intensity" used to set the lower limit threshold value $V_{thL}$ of exciting light excited by laser light (Ar 488/514) of channel 1, an input box 62, which is used to input the ratio of the "target lower limit fluorescence intensity", and a scroll bar 63, which is used to specify the ratio of the "target lower limit fluorescence intensity", are displayed on the setting sheet 55.

The input box 61, input box 62 and scroll bar 63 are respectively interlinked, and for example, when a user inputs the set value $V_L$ of the "target lower limit fluorescence intensity" in the input box 61, the ratio of the "target lower limit fluorescence intensity" is calculated from the set value $V_L$ and displayed in the input box 62 and the scroll bar 63. In addition, when a user sets the ratio of the "target lower limit fluorescence intensity" in the input box 62 or the scroll bar 63, the set value $V_L$ is calculated from that ratio and displayed in the input box 61.

In the laser scanning microscope 13, the intensity of fluorescent light (integrated value) can be set with a value from 0 to 4095, and in FIG. 3, a value of 205 is input in the input box 61 as the set value $V_L$ of the "target lower limit fluorescence intensity", a value of 5% is set in the input box 62 as the ratio of the "target lower limit fluorescence intensity" according to the set value $V_L$, and the slider of the scroll bar 63 is set to a position corresponding to 5%.

In addition, an input box 64, which is used to input a set value $V_H$ of a "target upper limit fluorescence intensity" used to set the upper limit threshold value $V_{thH}$ of excitation light excited by laser light (Ar 488/514) of channel 1, an input box 65, which is used to input the ratio of the "target upper limit fluorescence intensity", and a scroll bar 66 for specifying the ratio of the "target upper limit fluorescence intensity", are also displayed on the setting sheet 55.

The input box 64, the input box 65 and the scroll bar 66 are respectively interlinked in the same manner as the input box 61, input box 62 and scroll bar 63. In FIG. 3, a value of 1600 is input in the input box 64 as the set value $V_H$ of the "target upper limit fluorescence intensity", a value of 40% is set in the input box 65 as the ratio of the "target upper limit fluorescence intensity" according to the set value $V_H$, and the slider of the scroll bar 66 is set to a position corresponding to 40%.

In addition, settings for laser light (GRN 543) of channel 2 (CH2) are made using an input box 71, input box 72, scroll bar 73, input box 74, input box 75 or scroll bar 76 in the same manner as when making settings for the laser light of channel 1.

In addition, in the laser scanning microscope 13, in addition to processing that uses both the lower limit threshold value $V_{thL}$ and the upper limit threshold value $V_{thH}$, processing that only uses the lower limit threshold value $V_{thL}$ (namely, processing that does not control the shutters 32 even if a voltage has surpassed the upper limit threshold value $V_{thH}$), or processing that only uses the upper limit threshold value $V_{thH}$ (namely, processing that does not control the shutters 32 even if a voltage is less than the lower limit threshold value $V_{thL}$), can be carried out during CLEM processing. A switch button 81 for switching processing that uses the lower limit threshold value $V_{thL}$ on and off, and a switch button 82 for switching processing that uses the upper limit threshold value $V_{thH}$ on and off, are displayed on the setting sheet 55. A user can switch each processing on and off by operating the switch buttons 81 and 82.

In addition, an input box 83 is displayed for inputting a set value factor for setting the lower limit value judgment time $T_{thL}$, which is a time at which a judgment is made as to whether or not a voltage reaches the minimum voltage $V_{MIN}$ as was explained with reference to FIG. 2. This set value factor can be specified with, for example, a ratio at which the lower limit value judgment time $T_{thL}$ is decreased relative to the single pixel exposure time U, and this ratio is input based on a value of 100% for the time $T_{start}$ and a value of 0% for the time $T_{end}$. For example, a value of 80% is input as a set value factor in input box 83 in FIG. 3. Furthermore, the exposure time U is set to a value of, for example, 8.16 μsec.

The personal computer 14 calculates the lower limit threshold value $V_{thL}$ for laser light of channel 1 based on the set value $V_L$ input in the input box 61 of the CLEM setting screen 51 (or the set value $V_L$ determined from the ratio set with the input box 62 or the scroll bar 63) and the set value factor input in the input box 83. In addition, the personal computer 14 calculates the upper limit threshold value $V_{thH}$ ($V_{thH}=V_H \times a$ (U)) for laser light of channel 1 based on the set value $V_H$ input in the input box 64 of the CLEM setting screen 51 (or the set value $V_H$ determined from the ratio set with the input box 65 or the scroll bar 66).

Figure 4:
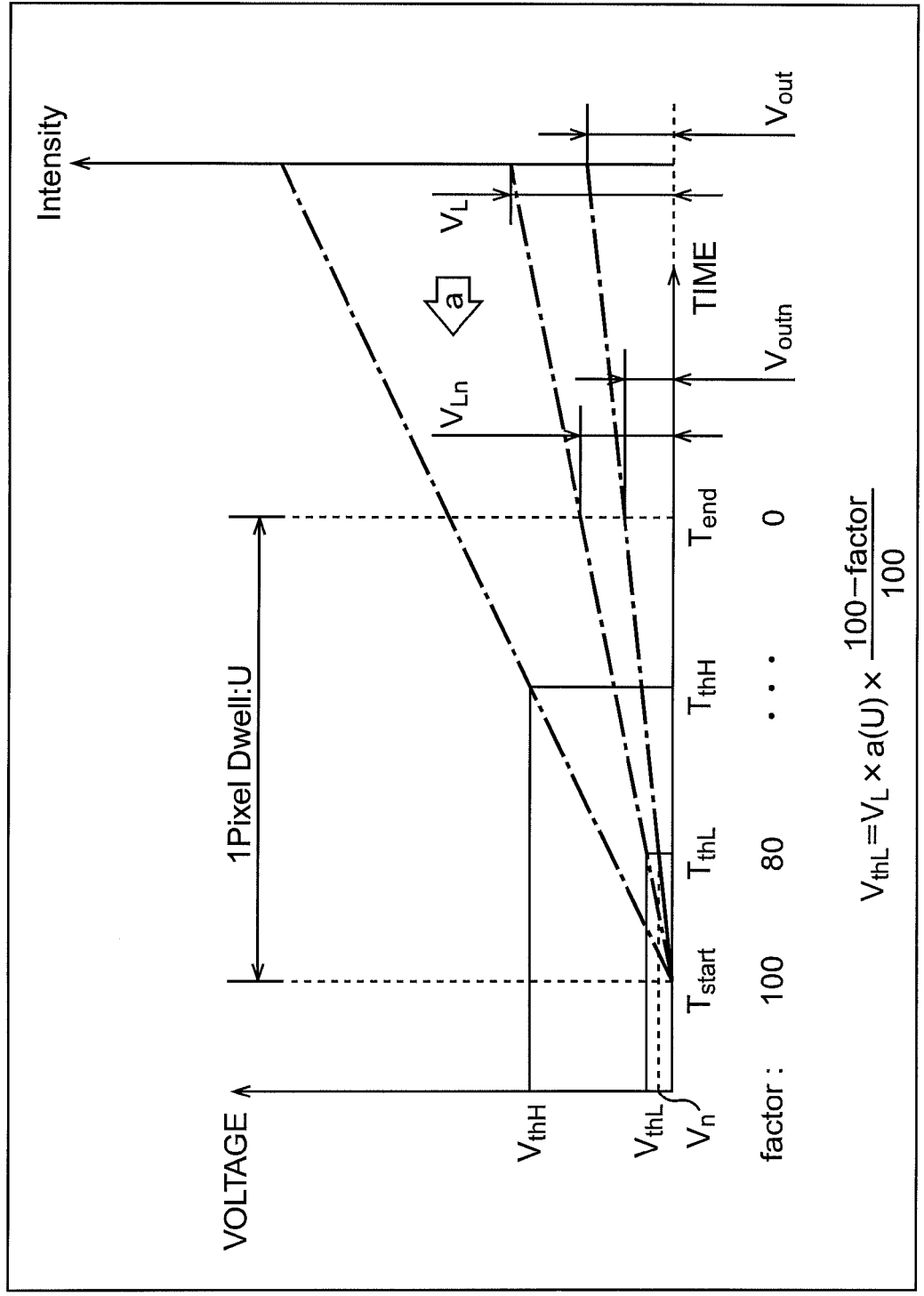
FIG. 4 is a drawing for explaining a method for calculating a lower limit threshold value $V_{thL}$.
Figure 5:
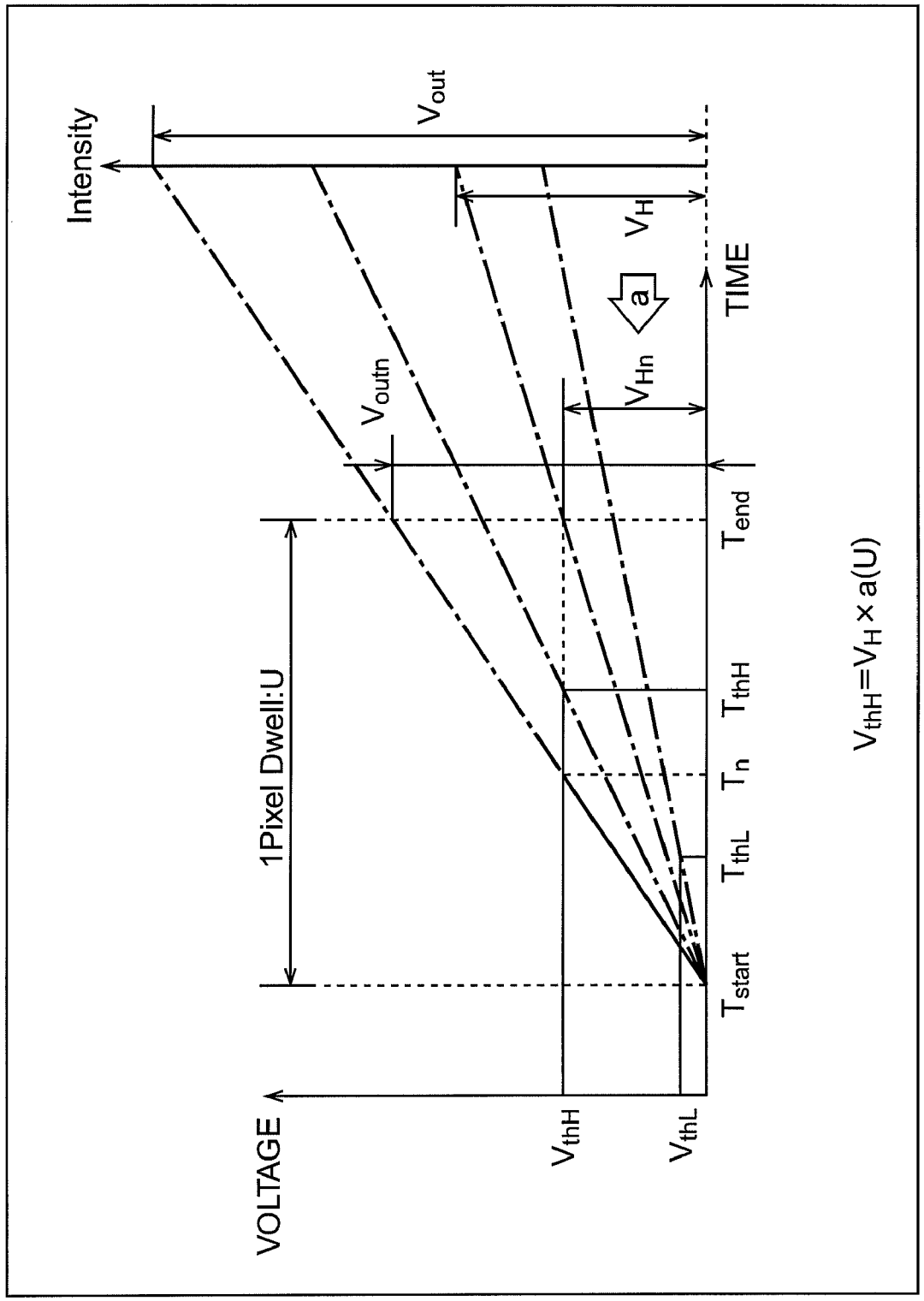
FIG. 5 is a drawing for explaining a method for calculating an upper limit threshold value $V_{thH}$.

Next, an explanation is provided of a method for calculating the lower limit threshold value $V_{thL}$, and the upper limit threshold value $V_{thH}$ with reference to FIGS. 4 and 5. In FIGS. 4 and 5, time is plotted on the horizontal axis and integrated values of the voltage of electrical signals output from the PMT 43 corresponding to the intensity of light received are plotted on the vertical axis in the same manner as in FIG. 2.

For example, the personal computer 14 runs the application software 17 and determines the lower limit threshold value $V_{thL}$ by calculating $V_{thL}=V_L \times a$ (U)$\times$(100−factor)/100 as shown in FIG. 4 using the set value factor input in the input box 83 of FIG. 3 and the set value $V_L$ of the "target lower limit fluorescence intensity" (intensity) input in the input box 61.

Here, a circuit constant a (U) is a constant that is determined in consideration of various parameters such as the single pixel exposure time U, which is set corresponding to the scanning speed of the laser light, and the processing speed in the CLEM processing unit 28. In addition, in FIG. 4, $V_{Ln}$ is a value (threshold value voltage) resulting from converting the set value $V_L$ of the "target lower limit fluorescence intensity" to a value when using as a threshold value in the CLEM processing unit 28.

Furthermore, when the voltage $V_n$ at the lower limit value judgment time $T_{thL}$ is equal to or less than the lower limit threshold value $V_{thL}$, irradiation of laser light is discontinued at the lower limit value judgment time $T_{thL}$, and a value $V_{out}$ is output that is obtained by converting an output voltage $V_{outn}$, which is determined by linearly extrapolating the voltage $V_n$ at the lower limit value judgment time $T_{thL}$, to light intensity.

In this manner, the lower limit threshold value $V_{thL}$ is calculated and set in the CLEM processing unit 28 by the application software 17 simply by a user inputting the set value $V_L$ and the set value factor on the CLEM setting screen 51 (FIG. 3). In addition, even in the case the set value $V_L$ and the set value factor have been changed, the application software 17 automatically calculates the lower limit threshold value $V_{thL}$ and changes the setting of the CLEM processing unit 28. Furthermore, even in the case, for example, the scanning speed of the laser light has been changed resulting in a change in the single pixel exposure time U, the application software 17 automatically calculates the lower limit threshold value $V_{thL}$ based on the circuit constant a (U) corresponding to that change and changes the setting of the CLEM processing unit 28.

In addition, the personal computer 14 determines the upper limit threshold value $V_{thH}$ by calculating $V_{thH}=V_H \times a$ (U) as shown in FIG. 5 by running the application software 17 and using the set value $V_H$ of the "target upper limit fluorescence intensity" input to the input box 64 of FIG. 3. In addition, in FIG. 5, $V_{Hn}$ is a value (threshold value voltage) that is obtained by converting the set value $V_H$ of the "target upper limit fluorescence intensity" to a voltage when using as a threshold value in the CLEM processing unit 28.

Furthermore, irradiation of laser light is discontinued at the time $T_n$ when the voltage has reached the upper limit threshold value $V_{thH}$, and the value $V_{out}$ is output that is obtained by converting the output voltage $V_{outn}$, which is determined by linearly extrapolating the upper limit threshold value $V_{thH}$ at time $T_n$, to light intensity.

In this manner, the upper limit threshold value $V_{thH}$ is calculated by the application software 17 and set in the CLEM processing unit 28 simply by a user inputting the set value $V_H$ on the CLEM setting screen 51 (FIG. 3). In addition, even in the case the set value $V_H$ has been changed, the application software 17 automatically calculates the upper limit threshold value $V_{thH}$ and changes the setting of the CLEM processing unit 28. Furthermore, even in the case, for example, the scanning speed of the laser light has been changed resulting in a change in the single pixel exposure time U, the application software 17 automatically calculates the upper limit threshold value $V_{thH}$ based on the circuit constant a (U) corresponding to that change and changes the setting of the CLEM processing unit 28.

As has been described above, in the laser scanning microscope system 11, the lower limit threshold value $V_{thL}$ and the upper limit threshold value $V_{thH}$ can be calculated based on set values input by a user using the CLEM setting screen 51.

In addition, when a user changes a set value using the CLEM setting screen 51, the lower limit threshold value $V_{thL}$ and the upper limit threshold value $V_{thH}$ can be calculated automatically corresponding to that change and applied to CLEM processing. For example, a user can confirm the effect of CLEM processing by viewing a displayed fluorescent image, and change a set value by carrying out an operation on the CLEM setting screen 51 (for example, moving the slider of the scroll bar 63), after which an image that reflects that input on a real-time basis is displayed. As a result, deterioration of the sample 12 can be inhibited and suitable fluorescent images can be acquired by a user suitably changing set values so that CLEM processing is carried out that enables the acquisition of suitable fluorescent images.

Namely, in a conventional laser scanning microscope, although damage to samples caused by laser light was unable to be effectively inhibited or suitable fluorescent images were unable to be acquired unless upper limit and lower limit threshold values were set properly, in the laser scanning microscope system 11, the lower limit threshold value $V_{thL}$ and the upper limit threshold value $V_{thH}$ can be set properly by using the CLEM setting screen 51, thereby making it possible to acquire suitable fluorescent images while inhibiting deterioration of the sample 12.

Furthermore, in the case, for example, values set in the input boxes 61 and 64 on the CLEM setting screen 51 are intensity values that are easily understood for a user, the hardware of the laser scanning microscope 13 can be adjusted by specifying those intensity values. In addition, fluorescent images that can be acquired by specifying these intensity values are fluorescent images that are desired to be acquired by a user, or in other words, suitable fluorescent images.

In addition, a user can prevent the lower limit threshold value $V_{thL}$ from being used in CLEM processing by operating the switch button 81 on the CLEM setting screen 51 for switching processing using the lower limit threshold value $V_{thL}$ on and off, or a user can prevent the upper limit threshold value $V_{thH}$ from being used in CLEM processing by operating the switch button 82 for switching processing using the upper limit threshold value $V_{thH}$ on and off. For example, the S/N ratio of fluorescent images can be improved by not using the lower limit threshold value $V_{thL}$ in CLEM processing.

Namely, in the case of carrying out CLEM extrapolation processing with an electrical signal equal to or less than the lower limit threshold value $V_{thL}$, the input signal actually input from the PTM 43 to the CLEM processing unit 28 is only a value obtained by dividing the lower limit threshold value $V_{thL}$ by the time $T_{end}$ (exposure time U), and for example, when the lower limit threshold value $V_{thL}$ is set to 20% of the minimum voltage $V_{MIN}$, linear extrapolation is carried out during CLEM extrapolation processing that amplifies that input signal (actually a signal resulting from adding a signal corresponding to the intensity of light received by the PMT 43 and a noise component) five-fold. In other words, the noise component contained in the input signal increases five-fold. Basically, noise components are always thought to be contained in input signals at a constant ratio, and if a noise component when a voltage is at the lower limit threshold value $V_{thL}$ is 20 mV, then the noise component at the time $T_{end}$ is also 20 mV. Thus, not using the lower limit threshold value $V_{thL}$ in CLEM processing makes it possible to avoid amplification of the noise component, thereby making it possible to improve the S/N ratio of fluorescent images.

In addition, in the case of not using the upper limit threshold value $V_{thH}$ in CLEM processing, since the input level itself of the input signal is large and processing is carried out on the voltage value at the time $T_n$, although the ratio at which the S/N ratio is improved is lower than in the case of not using the lower limit threshold value $V_{thL}$ in CLEM processing, the S/N ratio of fluorescent images can be similarly improved.

In this manner, in the laser scanning microscope system 11, in the case it has been judged that a voltage does not reach the minimum voltage $V_{MIN}$, and in the case it has been judged that a voltage exceeds the upper limit threshold voltage $V_{thH}$, a signal instructing the shutters 32 to close is supplied to the shutters 32 and irradiation of the sample 12 with laser light is discontinued. Here, in the laser scanning microscope system 11, since the sample 12 is irradiated with laser light of a plurality of different wavelengths and fluorescent light excited by each wavelength of laser light is detected by the fluorescence detection unit 26, it is necessary to control irradiation of the sample 12 for each wavelength of laser light.

Figure 6:
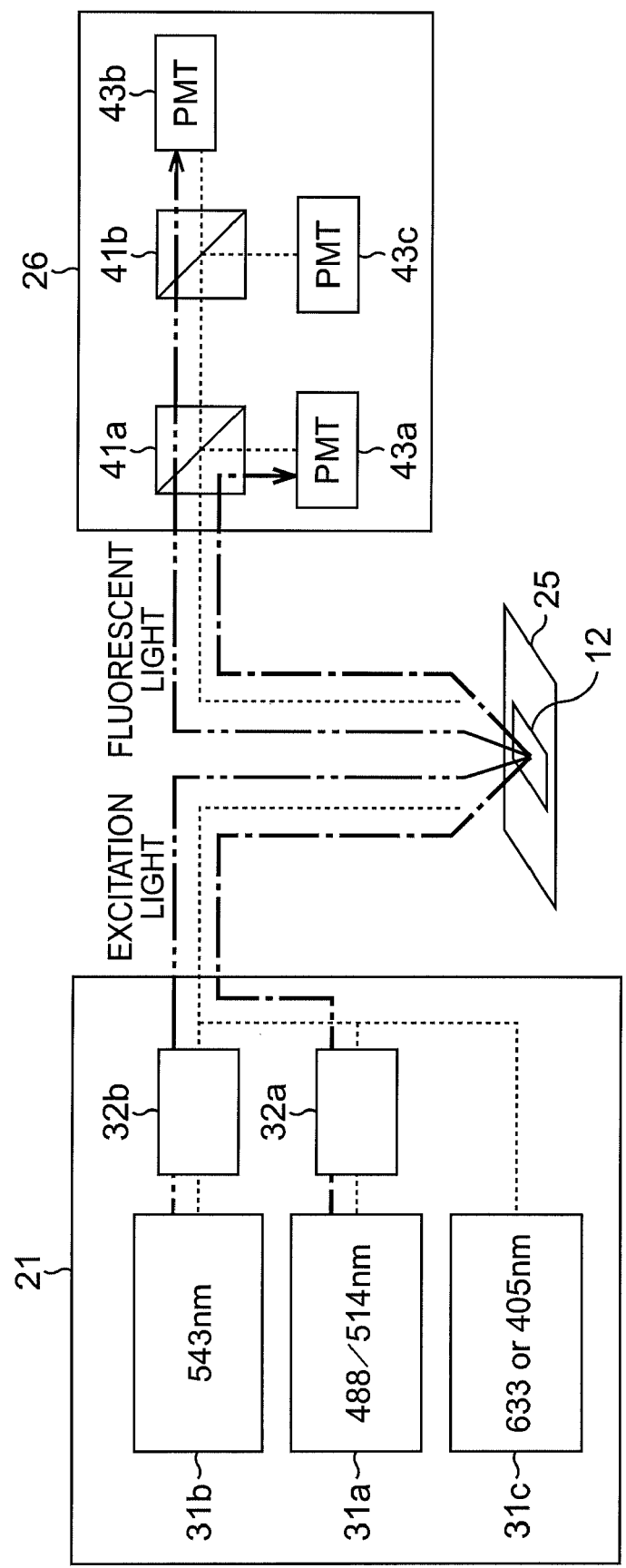
FIG. 6 is a drawing for explaining irradiation control of laser light.
Figure 7:
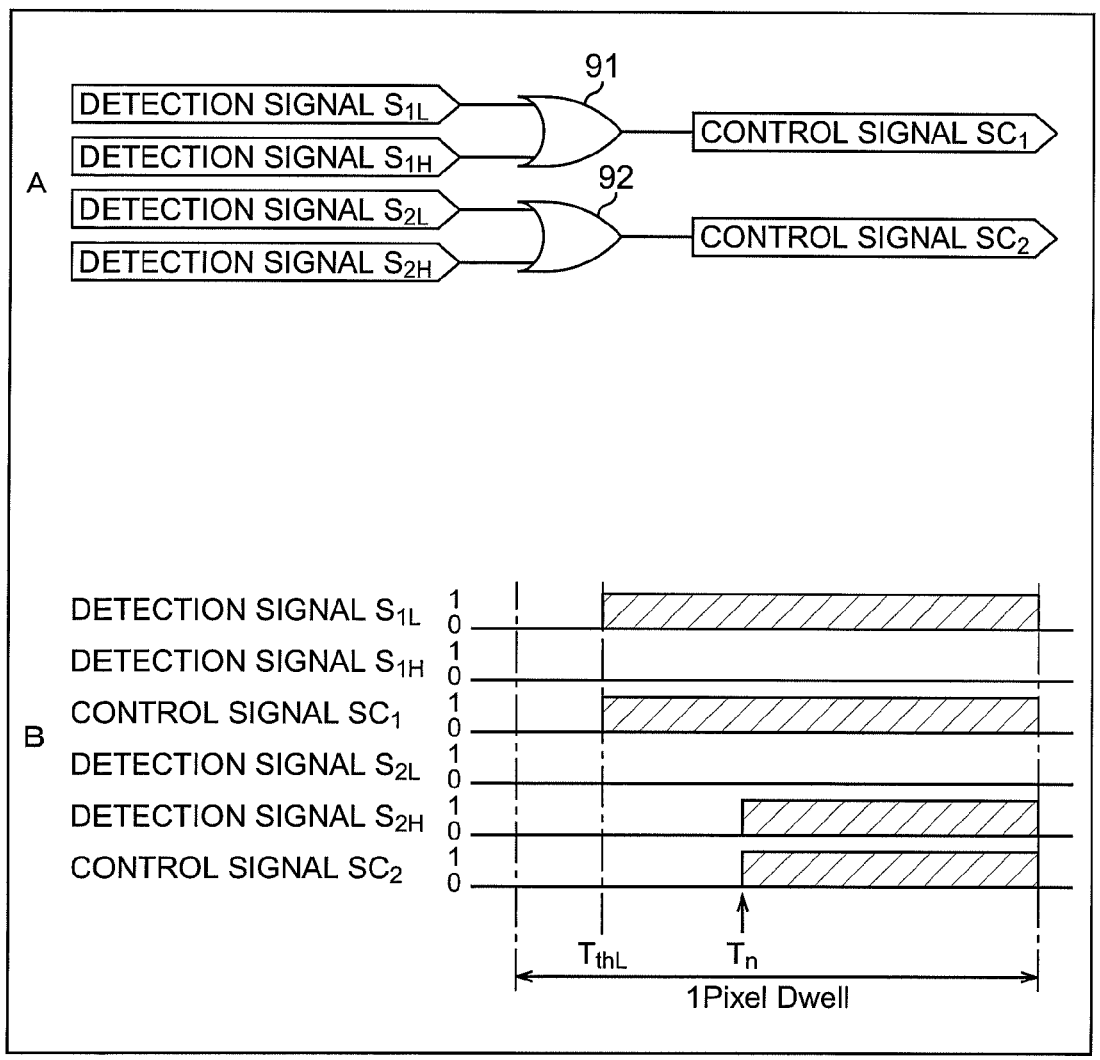
FIG. 7 is a drawing for explaining irradiation control of laser light.

Next, an explanation is provided of control of irradiation of each wavelength of laser light with reference to FIGS. 6 and 7.

Among each of the blocks that compose the laser scanning microscope system 11, the laser light source unit 21, the stage 25 and the fluorescence detection unit 26, which are required to explain control of irradiation of each wavelength of laser light, are shown in FIG. 6. Furthermore, in the laser light source unit 21 shown in FIG. 6, although shutters 32a and 32b are respectively provided for the laser light sources 31a and 31b, a configuration is employed in which a shutter is not provided for the laser light source 31c.

As shown in FIG. 6, laser light (wavelength: 488/514 nm) radiated from the laser light source 31a is radiated onto the sample 12 on the stage 25 through the shutter 32a, fluorescent light excited by that laser light (excitation light) is reflected by the DM 41a of the fluorescence detection unit 26, and that fluorescent light is received by the PMT 43a. In addition, laser light (wavelength: 543 nm) radiated from the laser light source 31b is radiated onto the sample 12 on the stage 25 through the shutter 32b, fluorescent light excited by that laser light (excitation light) passes through the DM 41a and DM 41b of the fluorescence detection unit 26, and that fluorescent light is received by the PMT 43b.

The CLEM processing unit 28 (FIG. 1) controls the shutter 32a in accordance with an electrical signal corresponding to the intensity of fluorescent light received by the PMT 43a, and controls the shutter 32b in accordance with an electrical signal corresponding to the intensity of fluorescent light received by the PMT 43b.

Namely, the CLEM processing unit 28 controls the shutters 32a and 32b based on logic circuits shown in FIG. 7.

As shown in FIG. 7A, a detection signal $S_{1L}$, which indicates the result of detecting whether or not the voltage $V_n$, which indicates the intensity of fluorescent light received by the PMT 43a, is less than the lower limit threshold value $V_{thL}$ at the lower limit value judgment time $T_{thL}$, and a detection signal $S_{1H}$, which is generated as a result of having judged that the voltage $V_n$, which indicates the intensity of fluorescent light received by the PMT 43a, has exceeded the upper limit threshold value $V_{thH}$, are input to an OR gate 91, and the OR gate 91 outputs a control signal $SC_1$ that controls closing of the shutter 32a based on the logical sum of the detection signal $S_{1L}$ and the detection signal $S_{1H}$.

For example, when the detection signal $S_{1L}$ detects that the voltage $V_n$, which indicates the intensity of fluorescent light received by the PMT 43a, is less than the lower limit threshold value $V_{thL}$ at the lower limit value judgment time $T_{thL}$, the level thereof changes from 0 to 1. In addition, when the detection signal $S_{1H}$ detects that a voltage indicating the intensity of fluorescent light received by the PMT 43a has exceeded the upper limit threshold value $V_{thH}$, the level thereof changes from 0 to 1.

Thus, as shown in FIG. 7B, the level of the detection signal $S_{1L}$ changes from 0 to 1 at the lower limit value judgment time $T_{thL}$ earlier than the detection signal $S_{1H}$, and as a result thereof, the level of the control signal $SC_1$ output by the OR gate 91 changes from 0 to 1 at the lower limit value judgment time $T_{thL}$. As a result, the shutter 32a is closed at the lower limit value judgment time $T_{thL}$ and irradiation of laser light from the laser light source 31a is discontinued.

Similarly, a detection signal $S_{2L}$, which indicates the result of detecting whether or not the voltage $V_n$, which indicates the intensity of fluorescent light received by the PMT 43b, is less than the lower limit threshold value $V_{thL}$ at the lower limit value judgment time $T_{thL}$, and a detection signal $S_{2H}$, which is generated as a result of having judged that the voltage $V_n$, which indicates the intensity of fluorescent light received by the PMT 43b, has exceeded the upper limit threshold value $V_{thH}$, are input to an OR gate 92, and the OR gate 92 outputs a control signal $SC_2$ that controls closing of the shutter 32b based on the logical sum of the detection signal $S_{2L}$ and the detection signal $S_{2H}$.

The detection signal $S_{2L}$ and the detection signal $S_{2H}$ change in the same manner as the detection signal $S_{1L}$ and the detection signal $S_{1H}$, and when the level of the detection signal $S_{2H}$ changes from 0 to 1 at a time $T_n$ at or after the lower limit value judgment time $T_{thL}$ as shown in FIG. 7B, the level of the control signal $SC_2$ output by the OR gate 92 changes from 0 to 1 at the time $T_n$. As a result, the shutter 32b is closed at the time $T_n$ and irradiation of laser light from the laser light source 31b is discontinued.

However, depending on the sample 12, a plurality of different wavelengths of fluorescent light may be emitted by excitation light of a certain single wavelength.

Figure 8:
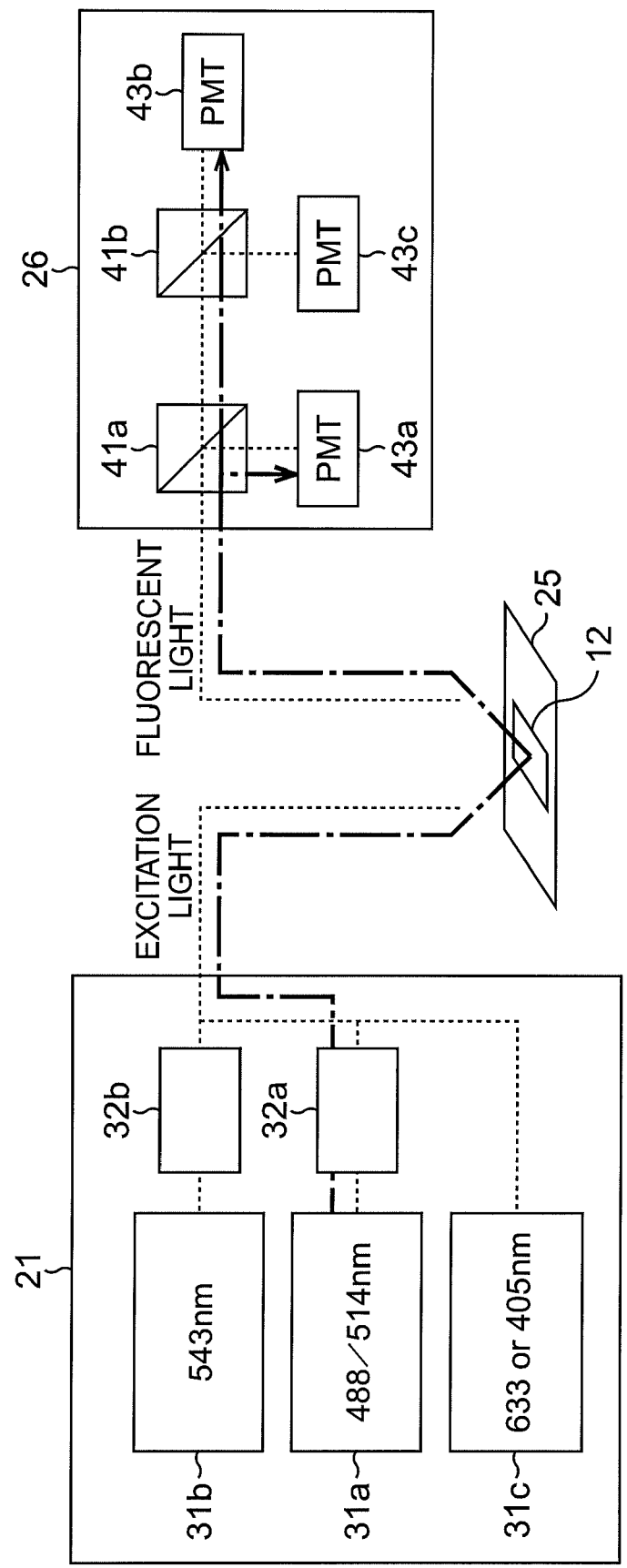
FIG. 8 is a drawing for explaining irradiation control in the case of fluorescent light of two wavelengths being emitted from a single laser light; and, FIG. 9 is a drawing for explaining irradiation control in the case of fluorescent light of two wavelengths being emitted from a single laser light.
Figure 9:
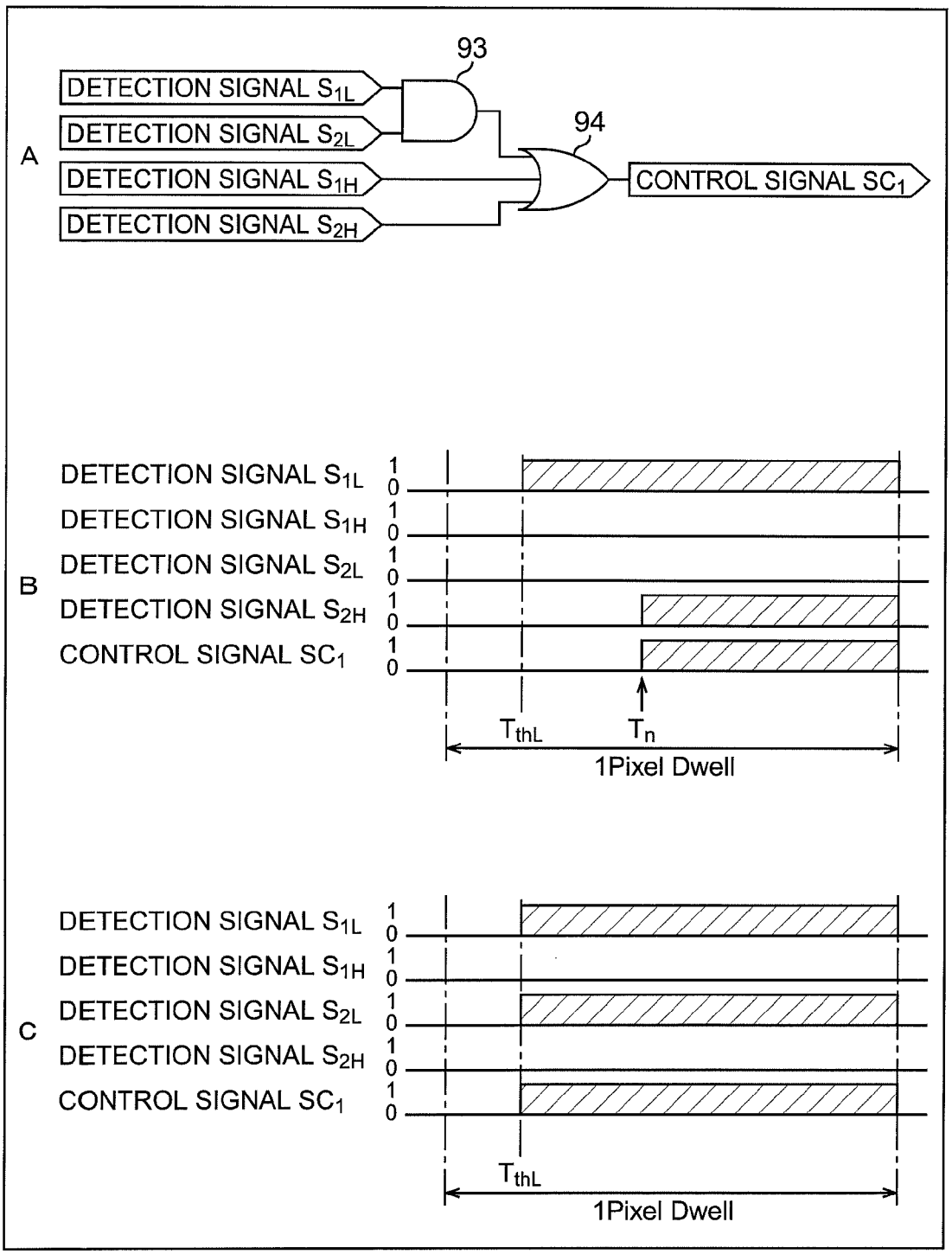

The following provides an explanation of controlling irradiation of laser light in the case two wavelengths of fluorescent light are emitted by a single laser light with reference to FIGS. 8 and 9.

FIG. 8 shows the laser light source unit 21, the stage 25 and the fluorescence detection unit 26 of the laser scanning microscope system 11 in the same manner as FIG. 6. As shown in FIG. 8, a single wavelength of fluorescent light, from the sample 12, that was excited by laser light radiated from the laser light source 31a is reflected by the DM 41a and received by the PMT 43a, while the other wavelength of fluorescent light passes through the DM 41a and the DM 41b and is received by the PMT 43b.

The CLEM processing unit 28 then controls the shutter 32a based on the logic circuits shown in FIG. 9.

As shown in FIG. 9A, the detection signal $S_{1L}$, which indicates the result of detecting whether or not the voltage $V_n$, which indicates the intensity of fluorescent light received by the PMT 43a, is less than the lower limit threshold value $V_{thL}$ at the lower limit value judgment time $T_{thL}$, and the detection signal $S_{2L}$, which indicates the result of detecting whether or not the voltage $V_n$, which indicates the intensity of fluorescent light received by the PMT 43b, is less than the lower limit threshold value $V_{thL}$ at the lower limit value judgment time $T_{thL}$, are input to an AND gate 93, and the AND gate 93 outputs a detection signal to an OR gate 94 based on the logical product of the detection signal $S_{1L}$ and the detection signal $S_{2L}$.

An output signal from the AND gate 93, a detection signal $S_{1H}$ which is generated as a result of having judged that a voltage indicating the intensity of fluorescent light received by the PMT 43a has exceeded the upper limit threshold value $V_{thH}$, and a detection signal $S_{2H}$ which is generated as a result of having judged that a voltage indicating the intensity of fluorescent light received by the PMT 43b has exceeded the upper limit threshold value $V_{thH}$, are input to the OR gate 94, and the OR gate 94 outputs the control signal $SC_1$ for controlling closing of the shutter 32a, based on the logical sum of the output signal from the AND gate 93, the detection signal $S_{1H}$ and the detection signal $S_{2H}$.

Thus, as shown in FIG. 9B, control of the shutter 32a is not carried out in the case only the level of the detection signal $S_{1L}$ changes to 1 at the lower limit value judgment time $T_{thL}$. The level of the control signal $SC_1$ output by the OR gate 94 changes from 0 to 1 at the time $T_n$ when the level of either the detection signal $S_{1H}$ or the detection signal $S_{2H}$ (the detection signal $S_{2H}$ changes earlier than the detection signal $S_{1H}$ in the example shown in FIG. 9B) changes to 1, and as a result thereof, the shutter 32a is closed at the time $T_n$ and irradiation of laser light from the laser light source 31a is discontinued.

In addition, as shown in FIG. 9C, since the level of the detection signal $S_{1L}$ changes from 0 to 1 at the lower limit value judgment time $T_{thL}$ earlier than either the detection signal $S_{1H}$ or the detection signal $S_{2H}$, and the level of the detection signal $S_{2L}$ has changed from 0 to 1 at the lower limit value judgment time $T_{thL}$, the level of the control signal $SC_1$ output by the OR gate 94 changes from 0 to 1 at the lower limit value judgment time $T_{thL}$. As a result, the shutter 32a is closed at the lower limit value judgment time $T_{thL}$ and irradiation of laser light from the laser light source 31a is discontinued.

In this manner, in the case any one intensity of fluorescent light having a plurality of different wavelengths has been judged to exceed the upper limit threshold value $V_{thH}$, or in the case all fluorescent light has been judged to be less than the minimum voltage $V_{MIN}$, control is carried out so that irradiation of laser light is discontinued, thereby enabling suitable fluorescent images to be acquired even in the case fluorescent light having a plurality of different wavelengths is emitted by excitation light having a certain single wavelength.

In addition, in the present description, a system refers to an entire apparatus composed of a plurality of apparatuses.

Furthermore, embodiments of the present invention are not limited to the embodiments described above, but rather can be changed in various ways within a range that does not deviate from the gist of the present invention.

The invention claimed is:

1. A laser scanning microscope that acquires images by scanning a sample with laser light, comprising:
   fluorescence measuring means for measuring a plurality of intensities of fluorescent light of different wavelengths that is excited by irradiation of the laser light and emitted from the sample; and
   irradiation control means for performing control, for each single pixel scanning time that is the amount of time during which a range corresponding to a single pixel of the image is scanned, to discontinue irradiation of the laser light in at least one of the case in which all of the plurality of intensities of fluorescent light are less than a lower limit threshold value at a lower limit value judgment time that is shorter than the time during which a range corresponding to a single pixel of the image is scanned, and the case in which any one of the plurality of intensities of fluorescent light exceeds an upper limit threshold value during the time during which a range corresponding to a single pixel of the image is scanned.

2. The laser scanning microscope according to claim 1, wherein
the fluorescence measuring means is constituted by a photoelectric conversion element that respectively receives the plurality of fluorescent light having different wavelengths and carries out photoelectric conversion thereon, and measuring means for measuring, as the intensity of each fluorescent light, an integrated value of photoelectric conversion signals accumulated moment by moment during the single pixel scanning time equivalent to a single pixel, and
the irradiation control means performs control to discontinue irradiation of the laser light based on the integrated value.

3. The laser scanning microscope according to claim 2, further comprising:
an image processing circuit that accumulates photoelectric conversion signals from the photoelectric conversion element during a scanning time equivalent to a single pixel, and generates images of the sample corresponding to the plurality of fluorescent light based on the accumulated photoelectric conversion signals; and
extrapolation processing means for calculating a first extrapolated value indicating intensity of the fluorescent light likely to be accumulated by the photoelectric conversion means during the single pixel scanning time by extrapolation processing based on the integrated value in the case the integrated value is less than the lower limit threshold value at the lower limit value judgment time, and similarly calculating a second extrapolated value indicating intensity of the fluorescent light likely to be accumulated by the photoelectric conversion means during the single pixel scanning time by extrapolation processing based on the integrated value in the case the integrated value exceeds the upper limit threshold value, wherein
the image processing circuit generates the image corresponding to the respective fluorescent light based on the first extrapolated value or the second extrapolated value.

4. The laser scanning microscope according to claim 1, wherein the irradiation control means performs control by switching control based on the lower limit threshold value on and off, and control based on the upper limit threshold value on and off, respectively.

5. The laser scanning microscope according to claim 1, further comprising:
extrapolation processing means for calculating a first extrapolated value indicating intensity of the fluorescent light likely to be accumulated by the fluorescence measuring means during the single pixel scanning time by extrapolation processing based on the intensity of fluorescent light in the case the intensity of fluorescent light is less than the lower limit threshold value at the lower limit value judgment time, and similarly calculating a second extrapolated value indicating intensity of the fluorescent light likely to be accumulated by the fluorescence measuring means during the single pixel scanning time by extrapolation processing based on the intensity of fluorescent light in the case the intensity of the fluorescent light exceeds the upper limit threshold value; and
input means for inputting at least one of a target upper limit intensity of the fluorescent light and a target lower limit intensity of the fluorescent light, wherein
the extrapolation processing means calculates back and sets at least one of the lower limit threshold value and the upper limit threshold value when at least one of the upper limit intensity of the fluorescent light and the lower limit intensity of the fluorescent light is input from the input means.

6. The laser scanning microscope according to claim 5, wherein the fluorescence measurement means is constituted by a photoelectric conversion element that receives the fluorescent light and carries out photoelectric conversion thereon, and measuring means for measuring, as the intensity of the fluorescent light, an integrated value of photoelectric conversion signals accumulated moment by moment during the single pixel scanning time equivalent to a single pixel, and
the irradiation control means performs control to discontinue irradiation of the laser light based on the integrated value.

7. The laser scanning microscope according to claim 6, wherein the irradiation control means performs control so that irradiation of the laser light is not discontinued during the single pixel scanning time in the case the integrated value is equal to or greater than the lower limit threshold value at the lower limit value judgment time and does not exceed the upper limit threshold value during the single pixel scanning time.

8. The laser scanning microscope according to claim 5, wherein the input means sets the lower limit value judgment time.

9. The laser scanning microscope according to claim 5, wherein the input means is constituted by two first and second input means for respectively inputting the lower limit intensity of the fluorescent light and the upper limit intensity of the fluorescent light,
the laser scanning microscope further comprises first and second changing means for respectively changing the lower limit intensity of the fluorescent light and the upper limit intensity of the fluorescent light input from the input means, and
the extrapolation processing means calculates back and sets the lower limit threshold value and the upper limit threshold value based on the lower limit intensity of the fluorescent light and the upper limit intensity of the fluorescent light changed by the first and second changing means.

* * * * *

UNITED STATES PATENT AND TRADEMARK OFFICE
CERTIFICATE OF CORRECTION

PATENT NO.        : 8,129,697 B2                           Page 1 of 1
APPLICATION NO.   : 12/858557
DATED             : March 6, 2012
INVENTOR(S)       : Shigeyuki Mano et al.

It is certified that error appears in the above-identified patent and that said Letters Patent is hereby corrected as shown below:

Title Page, Item [56] First Column in the Issued Patent, Under Foreign Application Priority Data, Delete "Feb 22, 2008 [JP]     P2008-041499
Feb 22, 2008 [JP]      P2008-041528
Apr 21, 2008 [JP]      P2008-110659
Apr 21, 2008 [JP]      P2008-110660"

and insert

-- Feb 22, 2008 [JP]    2008-041499
Feb 22, 2008 [JP]       2008-041528
Apr 21, 2008 [JP]       2008-110659
Apr 21, 2008 [JP]       2008-110660 --, therefor.

Signed and Sealed this
Third Day of July, 2012

David J. Kappos
*Director of the United States Patent and Trademark Office*